3,546,195
HALOGENATED BUTENE-1 POLYMERS

Thomas H. Shepherd, Hopewell, and Walter Polovina, Princeton, N.J., assignors to Princeton Chemical Research, Inc., Princeton, N.J., a corporation of New Jersey
No Drawing. Filed Nov. 17, 1966, Ser. No. 595,014
Int. Cl. C08f 3/20
U.S. Cl. 260—93.7
8 Claims

ABSTRACT OF THE DISCLOSURE

Improvements in the production of chlorinated polybutene-1 whereby a chlorinated polybutene is formed having improved thermostability. The chlorination is carried out with the polymer in true solution in a suitable solvent between about 45 and 58° C. with a butene-1 polymer having a melt index of about 0.1 to 60.

---

This invention relates to chlorinated polybutene-1. It more particularly refers to a novel method of producing chlorinated polybutene-1. It further relates to the novel products of this production method.

Polymers of butene-1 are well known in the art. It is also known that such polymers can be chlorinated by dissolving the polymer in a suitable solvent, heating the solution to about 60 to 90° C. and bubbling chlorine through the heated solution. Upon removal of the solvent, a chlorinated polymer is recovered which has many desirable properties for use in the manufacture of molded articles by extrusion, blow molding, vacuum forming, etc. as is common with many thermoplastic material.

Such chlorinated polybutene-1 has many properties which are detrimental to its use for many applications, and in many molding and forming processes. In particular, polybutene chlorinated at high temperatures tends to be brown, is not readily extruded at elevated temperatures, e.g., 155° to 200° C. and requires stabilizers for satisfactory molding. At 193° C. the chlorinated polybutene decomposes within two minutes. Thus, the polymer is difficult to process in commercial fabricating equipment and also requires large amounts of expensive stabilizers.

It is therefore an object of this invention to provide a novel halogenated polybutene-1 which is not subject to the deficiencies of prior art materials.

It is another object of this invention to provide a novel process for producing halogenated polybutene-1.

It is a further object of this invention to provide novel chlorinated polybutene-1.

It is a still further object of this invention to provide a novel chlorination for butene-1 polymers.

Other and additional objects of this invention will become apparent from a consideration of this entire specification, including the claims appended hereto.

In accord with and fulfilling these objects, one aspect of this invention resides in the production of halogenated polymers of butene-1 by conducting the halogenation at lower temperatures than has been the practice in the prior art. It has surprisingly been found that by carrying out the halogenation at up to about 60° C. instead of at the higher temperatures practiced by the prior art, the halogenated butene-1 polymer resulting has a much higher thermal stability than comparable prior art polymers, even where no thermal stabilizer has been admixed therewith or incorporated therein. Further, it has been found that the novel halogenated polymer produced according to the novel process of this invention has superior tensile strength, alkali resistance and acid resistance. Still further, it has been found that the halogenated butene-1 polymers according to this invention generally maintain their desirable properties during prolonged heating, as for example during long molding processes. By way of comparison, polyvinyl chloride has physical properties which significantly degrade as a function of heating time.

The novel products of this invention are eminently useful, for example, to produce blow molded bottles and other articles, surface coatings, shrinkable films, piping, fittings, and various other molded and/or extruded shapes.

According to this invention, it is preferred to utilize homopolymers of butene-1. These homopolymers may be produced from butene-1 in such manner as to result in wholly isotactic or atactic polymers. It has been found that the polymer may similarly be a blend of both these configurations, and in fact that the degree of isotacticity of the polymer is in no way determinative of the physical properties of the halogenated product, at least insofar as these properties compare with the same properties of halogenated butene-1 polymers made at high temperatures according to the prior art. Thus the butene-1 homopolymer to be halogenated according to this invention may have a configuration varying from 0 to 100% insofar as its isotacticity is concerned. It is further within the scope of this invention to utilize co- or higher polymers of butene-1 with one or more olefinically unsaturated hydrocarbon comonomers. In this regard it should be understood that such copolymers are predominantly butene-1 and that the applicable comonomers are exemplified by ethylene, propylene, butadiene, isoprene, etc. and mixtures thereof.

Where homopolymeric butene-1 is utilized, it is preferred that the polymer to be halogenated have a melt index (ASTM D1238–57) in the range of about 0.1 to 60, preferably above 0.5 and below 20. These polymers are generally known in the art and may be available commercially.

According to the process of this invention, the butene-1 polymeric dissolved in a suitable solvent which is substantially inert to both the polymer and to the halogenating agent under conditions of halogenation and ambient conditions. These solvents are exemplified by chlorinated hydrocarbons, in particular tetrachloroethylene, hexachloroethane, carbon tetrachloride, chloroform, trichloroethylene, mono-, di-, and trichlorobenzene. It is generally preferable to employ about a 3 to 15 weight percent solution of polymer. If possible, higher concentrations of polymer may be used if it is practical to prepare such solutions having a satisfactory viscosity suitable for the use intended. The halogenation of butene-1 polymers is generally known in the art, and the instant improved product is produced according to the process of the prior art in all particulars and generalities with the exception of temperature. Whereas in the prior art halogenation of butene-1 polymer has been carried out at high temperatures, as aforesaid, it is essential to the process of this invention to operate the halogenation at less than about 60° C., preferably between about 45 and 58° C.

The halogenation is carried out by bubbling the appropriate hologen through the polymer solution at the described temperature. The halogenation may be catalyzed in a known manner through the aid of ultraviolet light or various peroxides alone or in combination, e.g., bnezoyl peroxide, methyl ethyl ketone peroxide, t-butyl hydroperoxide and by azo-iso butyronitrile. The catalyst, in the case of peroxides and/or azo compounds, is suitably dissolved in the polymer solution. The catalyst concentration should be maintained as low as possible in order to simplify purification of the product. Suitably, catalyst concentrations of about 0.1 to 2 weight percent have been utilized with success.

Upon completion of the chlorination, as evidenced by the solution taking up no more halogen or by the solution having taken up a specific predetermined quantity of halogen, the chlorinated polymer product may be recovered from the solution by any one or more of various known techniques. For example, the solvent may be evaporated, thus leaving the halogenated polymer behind, or a non-solvent for the polymer may be added to the solution whereby the halogenated polymer is precipitated, or the solution temperature may be lowered to cause precipitation of the halogenated polymer, or combinations of these or other known means. It may be desirable to remove substantially all traces of solvent from admixture with the product polymer, in which case the halogenated polymer may be dried in any conventional way, such as for example by treating in an oven at about 20 to 90° C., preferably 50 to 80° C.

It is within the scope of this invention to produce halogenated polymers having a halogen content of about 3 to 70%. It is preferred, however, to provide halogen contents of about 25 to 40% for most applications.

While it is possible, practical, and possibly preferable to produce halogenated butene-1 polymers according to this invention which do not require admixture of thermal stabilizers therewith in order to be adapted to produce shaped articles by molding or extrusion, it has been found that under some circumstances it is desirable to even further improve the thermal stability of these halogenated polymers. This can be accomplished by admixing with the halogenated polymers, thermal stabilizers similar in nature to those used in the prior art. It has been found in this case that even further improvement is realized, in that smaller quantities of thermal stabilizers can be used to accomplish better results, insofar as thermal stability is concerned, than is possible with prior art halogenated polymers of butene-1. Further, since thermal stabilizers are relatively expensive materials, economic advantage is obtained by being able to use smaller quantities of stabilizers. The stabilizers which may be used in the practice of this invention are generally of the type and class which are well known in the art. These are exemplified by organo-tin compounds, barium, calcium and lead salts, epoxidized organic compounds, etc. The quantity of stabilizer depends on the effectiveness of any particular stabilizer, and the processing conditions under which fabrication is to be carried out. In general, the amount of stabilizer required for adequate protection is less than five parts per hundred parts of resin.

The chlorinated polybutene of this invention may be compounded with plasticizers, antioxidants, U.V. stabilizers and the like.

While this invention is applicable to the halogenation of butene-1 polymers in general, it is preferred that the halogen employed be chlorine. A suitable halogenating agent is chlorine gas.

The following examples are given by way of illustration of this invention and are not to be considered as limiting thereon:

EXAMPLE 1

To 250 grams of polybutene-1 having 90% ether insolubility and a melt index of 0.3 was added 4000 grams of carbon tetrachloride in a 5-liter resin flask equipped with a stirrer, Dry Ice condenser, chlorine inlet and exit tube. The exit tube led from the Dry Ice condenser through a safety bottle to a caustic trap for absorption of hydrogen chloride.

The polymer was dissolved in the carbontetrachloride by warming the mixture to about 75° C. The solution was cooled to 50° C. and 1.3 grams of azoisobutyronitrile was added.

Chlorine was collected as a liquid from the chlorine cylinder in a calibrated Dry Ice cooled trap. The chlorine was allowed to vaporize into the reaction flask at such a rate to keep a slow reflux of chlorine from the Dry Ice condenser. A total of 398 grams of chlorine was added slowly over a period of 6.25 hours. The temperature of the mixture was held at 42° to 56° C. The mixture was cooled to room temperature and then nitrogen was blown through the mixture for two to three hours to remove dissolved hydrogen chloride. The polymer solution was added slowly to methanol in a Waring Blendor to precipitate the polymer. After washing the polymer several times with methanol, the polymer was dried at 80° C. in a vacuum oven for 17 hours. A yield of 360 grams of white polymer having a chlorine content of 30.5% was obtained.

EXAMPLE 2

Polybutene-1 having a melt index of 0.3 was milled on a two-roll mill for ten minutes at about 150° F. The melt index of the milled polymer was 7.3.

To 250 grams of the milled polybutene was added 2500 grams of carbon tetrachloride in a 5-liter flask equipped with a stirrer, Dry Ice condenser, chlorine inlet and exit tube. The polymer was dissolved by warming the solution to 75° C.

The reaction mixture was irradiated by an ultraviolet sun lamp. After one hour of chlorination 1000 grams of carbon tetrachloride was added. A total of 475 grams of chlorine was added to the reaction mixture over a period of 3.5 hours. The temperature of the reaction mixture was held at an average temperature of 57° C. during this period. The reaction mixture was blown with nitrogen after the chlorine addition. The polymer was precipitated from solution and processed by the procedure given in Example 1. A yield of 454 grams of a white polymer having a chlorine content of 44.8% was obtained.

The polymer was pressed at 285° F. and a clear, stiff film was obtained.

EXAMPLE 3

To 250 grams of polybutene-1 having a melt index of 0.3 was added 3000 grams of carbon tetrachloride in a 5-liter flask equipped with a stirrer, Dry Ice condenser, chlorine inlet and exit tube. The polymer was dissolved by heating the mixture to 75° C. After cooling to 30° C. 1.25 grams of azo-isobutyronitrile was added to the solution. At 1.7, 2.7 and 4.2 hours of chlorination, 500, 420 and 500 grams respectively of carbon tetrachloride were added. A total of 454 grams chlorine was added at a reaction temperature of 44° to 60° C. over a period of 4.7 hours. The mixture was blown with nitrogen and the polymer recovered from the solution by the procedure described in Example 1. A yield of 409.1 grams of white polymer having a chlorine content of 38.9% chlorine was obtained.

EXAMPLE 4

Polybutene-1 was chlorinated by the procedure given in Table I. To a solution of 250 grams polybutene having a melt index of 4.5, 3000 grams carbon tetrachloride and 1.25 grams of azo-isobutyronitrile was added. At 1.0 hour of reaction, 500 grams of carbon tetrachloride was added. A total of 540 grams of chlorine was added at a reaction temperature of 48° to 60° C. over a period of 5.0 hours. After processing by the technique given in Example 1, 219.4 grams of white polymer having a chlorine content of 46.8% was obtained.

EXAMPLE 5

Polybutene-1 was milled on a two-roll mill for ten minutes at about 150° F. The melt index of the milled polymer was 22.0.

To 265 grams of the milled polybutene were added 2000 grams of carbon tetrachloride and 2.65 grams of benzoyl peroxide in a 5-liter flask equipped with a stirrer, Dry Ice condenser, chlorine inlet and exit tube. The polymer was dissolved by warming the mixture to 75° C. After cooling to 52° C. 1000 grams of carbon tetrachloride was added. At 4.5 hours of reaction, 0.5 gram benzoyl peroxide was added. A total of 825 grams of chlorine was added over a period of 5.75 hours at a reaction temperature of 62° to 70° C. The mixture was blown with nitrogen and the polymer was recovered from the solution and processed by the procedure given in Example 1. A yield of 410 grams of polymer having a chlorine content of 35.4% was obtained.

EXAMPLE 6

To 300 grams of polybutene-1 of 0.3 melt index was added 2000 cc. of carbon tetrachloride in a 5-liter flask equipped with a stirrer, Dry Ice condenser, chlorine inlet and exit tube. The mixture was heated to 55° C. and a solution of 3 grams benzoyl peroxide in 25 cc. of carbon tetrachloride was added. A total of 380 grams of chlorine was added over a period of 15 hours at a reaction temperature of 57° to 78° C. The polymer was processed by the procedure given in Example 1. A yield of 435 grams of polymer having a chlorine content of 31.0% was obtained.

Samples of the polymer were fed into the extruder at different temperatures. When the polymer was extruded at 155° C. the extrudate was degraded, as evidenced by gassing and a darkened polymer. At an extrusion temperature of 200° C. the polymer was dark grey and foamed badly. Loss of flow occurred in eight minutes at 155° C. and in two minutes at 200° C.

EXAMPLES 7–13

The thermal stabilities of chlorinated polybutenes made in Examples 1 through 5 and of a commercial polyvinyl chloride were evaluated by molding for different periods at 380° F. without stabilizer. Molding data and tensile properties are given in Table I. Polymer from Example 5 degraded when pressed at 380° F. without a stabilizer. Polymer from Example 4 did not degrade when heated for 32 minutes at 380° F. without any stabilizer.

TABLE I.—TENSILE PROPERTIES OF CHLORINATED POLYBUTENE AND POLYVINYLCHLORIDE
[Molded at 380° F. without stabilizer]

| Example No. | Polymer used | Mold time, min. | Tensile strength, p.s.i. | Elongation, percent | Tensile modulus |
|---|---|---|---|---|---|
| 7 | Ex. 2 | 2 | 5,870 | 3.0 | 222,500 |
| 8 | Ex. 3 | 2 | 5,550 | 3.1 | 185,600 |
| 9 | Ex. 4 | 2 | 6,050 | 3.1 | 205,900 |
| 10 | Ex. 5 | 2 | Polymer charred | | |
| 11 | PVC | 2 | 8,220 | 12.8 | 300,600 |
| 12 | Ex. 4 | 32 | 5,380 | 3.1 | 235,800 |
| 13 | PVC | 32 | 4,730 | 5.8 | 187,500 |

EXAMPLE 14

Chlorinated polybutene made in Example 1 was dissolved in carbon tetrachloride at a concentration of 10%. Sanded copper strips were dipped into the solution and baked for 15 minutes at 110° C. The coated strips were immersed in 10% nitric acid and 20% sodium hydroxide for 24 hours at room temperature. There was no noticeable effect on the coated strips.

EXAMPLE 15

A strip of sanded malleable iron 1 x 6 inches x 50 mils was preheated to 385° F., rolled in the chlorinated polybutene from Example 1 and then fused at 400° F. in 15 minutes. There was no effect on the coating when immersed in either 20% NaOH or 10% nitric acid for 24 hours.

Accordingly, this invention describes chlorinated polybutene having superior thermal stability which facilitates its processing on a mill or in an extruder, permits higher molding temperatures, and shortens its processing time. This thermal stability is evidenced by the fact that such halogenated, particularly chlorinated, polybutene-1 is substantially free of thermal degradation even after exposure to a temperature of at least about 350° F. for at least about 30 minutes.

What is claimed is:

1. In the process for halogenating butene-1 polymers having a melt index of about 0.1 to 60 by dissolving said polymers in an inert solvent and contacting said solution with a halogenating agent to produce a halogenated butene-1 polymer, the improvement which comprises carrying out said halogenation at a temperature of about 45 to 58° C.

2. The improved process claimed in claim 1 wherein said halogen is chlorine and said butene-1 polymer is a homopolymer.

3. The improved process claimed in claim 2 carried out in the presence of a chlorination catalyst.

4. The improved process claimed in claim 2 wherein said polymer has a mixed atactic and isotactic structure.

5. Chlorinated polybutene-1 produced by the process of claim 1 having a melt index of about 0.1 to 60 having a chlorine content of about 3 to 70 percent and exhibiting substantial freedom from thermal degradation upon exposure to a temperature of about 350° F. for at least about 30 minutes.

6. Chlorinated polybutene-1 as claimed in claim 5 having a chlorine content of about 25 to 40 weight percent.

7. Chlorinated polybutene-1 as claimed in claim 5 having a polymer structure containing about 0 to 100 percent isotacticity.

8. Chlorinated polybutene-1 as claimed in claim 5 wherein said polymer is a homopolymer.

References Cited

UNITED STATES PATENTS

| | | | |
|---|---|---|---|
| 3,049,455 | 8/1962 | Werkman et al. | 154—43 |
| 3,060,164 | 10/1962 | Canterino | 260—94.9 |
| 2,513,330 | 7/1950 | Kaganoff | 260—94.9H |
| 3,322,672 | 5/1967 | Stanton | 260—94.9H |
| 3,341,508 | 9/1967 | Elsner et al. | 60—94.9H |

JOSEPH L. SCHOFER, Primary Examiner

R. A. GAITHER, Assistant Examiner

U.S. Cl. X.R.

260—85.3, 94.9